(12) United States Patent
Brown et al.

(10) Patent No.: US 9,060,162 B2
(45) Date of Patent: Jun. 16, 2015

(54) PROVIDING MULTIPLE VIEWER PREFERENCES ON A DISPLAY DEVICE

(71) Applicant: ATI Technologies ULC, Markham (CA)

(72) Inventors: Randall A. Brown, Toronto (CA); Cheng He, Oshawa (CA); Jitesh Arora, Markham (CA); Sung Kwan Heo, Oakville (CA)

(73) Assignee: ATI Technologies ULC, Markham, Ontario (CA)

( * ) Notice: Subject to any disclaimer, the term of this patent is extended or adjusted under 35 U.S.C. 154(b) by 255 days.

(21) Appl. No.: 13/723,291

(22) Filed: Dec. 21, 2012

(65) Prior Publication Data

US 2014/0176580 A1  Jun. 26, 2014

(51) Int. Cl.
| | |
|---|---|
| *G06T 1/00* | (2006.01) |
| *H04N 13/00* | (2006.01) |
| *H04N 21/4223* | (2011.01) |
| *H04N 21/45* | (2011.01) |
| *H04N 21/431* | (2011.01) |
| *H04N 21/4415* | (2011.01) |
| *H04N 5/44* | (2011.01) |
| *H04N 5/445* | (2011.01) |
| *H04N 21/442* | (2011.01) |

(52) U.S. Cl.
CPC ........... *H04N 13/00* (2013.01); *H04N 21/4223* (2013.01); *H04N 21/4532* (2013.01); *H04N 2005/4428* (2013.01); *H04N 2005/4442* (2013.01); *H04N 2005/44569* (2013.01); *H04N 21/44204* (2013.01); *H04N 21/431* (2013.01); *H04N 21/4316* (2013.01); *H04N 21/4415* (2013.01); *H04N 21/44218* (2013.01)

(58) Field of Classification Search
USPC .................................. 345/418, 520; 382/118
See application file for complete search history.

(56) References Cited

U.S. PATENT DOCUMENTS

| | | | | |
|---|---|---|---|---|
| 2009/0138805 | A1* | 5/2009 | Hildreth | 715/745 |
| 2009/0174658 | A1* | 7/2009 | Blatchley et al. | 345/158 |
| 2010/0156627 | A1* | 6/2010 | Kennedy | 340/539.16 |
| 2010/0259473 | A1* | 10/2010 | Sakata et al. | 345/156 |
| 2010/0328492 | A1* | 12/2010 | Fedorovskaya et al. | 348/231.2 |
| 2012/0084652 | A1* | 4/2012 | Martinez Bauza et al. | 715/719 |
| 2013/0169769 | A1* | 7/2013 | Lee | 348/56 |
| 2014/0062852 | A1* | 3/2014 | Naveh | 345/156 |

* cited by examiner

*Primary Examiner* — Maurice L McDowell, Jr.
(74) *Attorney, Agent, or Firm* — Volpe and Koenig, P.C.

(57) ABSTRACT

A system and method for providing viewer preferences on a display device are presented. An embodiment includes a storage medium for storing preset viewer preferences, each preference being categorized based on one of a plurality of viewers, a processor that accesses the storage medium and acquires the stored preset viewer preference for a given one of the plurality of viewers, and a display device that provides content to the viewer in accordance with the viewer's preferences using at least one optical element.

26 Claims, 7 Drawing Sheets

PROVIDING MULTIPLE VIEWER PREFERENCES ON A DISPLAY DEVICE

TECHNICAL FIELD

The disclosed embodiments are generally directed to providing or displaying information to at least one viewer, and in particular, to a system and method of providing multiple viewer preferences on a display device.

BACKGROUND

Display devices are configured to provide the same multimedia experience to each viewer viewing the display device at a given time. All of the customizable settings on the display device are shared with all viewers of the display device. All viewers viewing a given display device view the same image. The display device applies one set of preferences at a time for all viewers of the display.

There may be a benefit to providing multiple viewer preferences to viewers viewing a display device allowing each viewer to satisfy their individual preferences simultaneously.

SUMMARY OF EMBODIMENTS

A system and method for providing viewer preferences on a display device are presented. Some embodiments include a storage medium for storing preset viewer preferences, each preference being categorized based on one of a plurality of viewers, a processor that accesses the storage medium and acquires the stored preset viewer preference for a given one of the plurality of viewers, and a display device that provides content to the viewer in accordance with the viewer's preferences using at least one optical element.

BRIEF DESCRIPTION OF THE DRAWINGS

A more detailed understanding may be had from the following description, given by way of example in conjunction with the accompanying drawings wherein.

DETAILED DESCRIPTION

A system and method for providing viewer preferences on a display device is disclosed. Some embodiments include a storage medium for storing preset viewer preferences with each preference being categorized based on one of a plurality of viewers, a processor that accesses the storage medium and acquires the stored preset viewer preference for a given one of the plurality of viewers, and a display device that provides content to the viewer in accordance with the viewer's preferences using at least one optical element. Some embodiments create a per viewer display preference to be applied for multiple viewers simultaneously. Some embodiments may be beneficial when the number of viewers is greater than one for an actively viewed display device. Although, the system may still provide viewer preferences to a single viewer. The display device may identify viewers, manually or via other means, including, but not limited to, facial recognition, and apply the preferences of the viewer to ensure that the viewer receives optimal viewing experience per their respective preferences.

Figure 1:
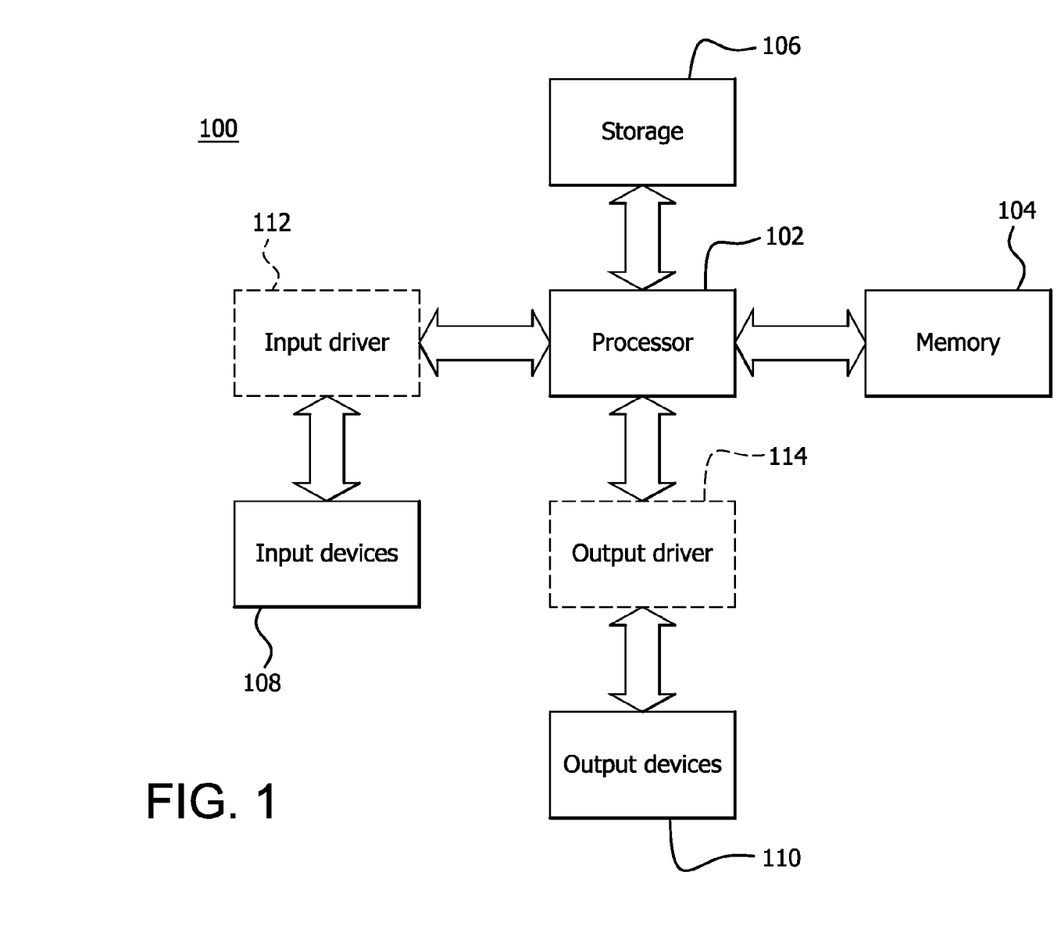
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2A:
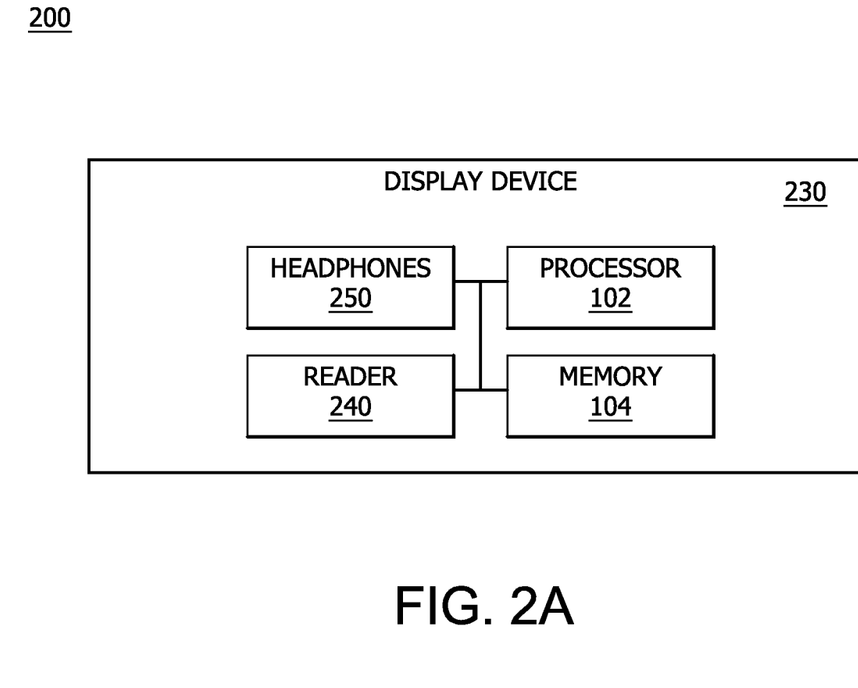
FIG. 2A illustrates a system for providing multiple viewer preferences, in accordance with some embodiments.

FIG. 2A illustrates a system 200 for providing multiple viewer preferences, in accordance with an embodiment. System 200 includes a display device 230 displaying content to a plurality of viewers in a multiview mode. The content may include a first portion displayed to a first of the plurality of viewers that is unique to that first viewer, and a second portion displayed to a second of the plurality of viewers that is unique to that second viewer. The content may include a third portion displayed to both the first and second viewers. Operationally, system 200 includes processor 102 coupled to storage 106 that collectively produce information to be displayed on a display device 230. System 200 may include a reader 240 that determines if viewers are viewing display device 230, and further if there are viewers, reader 240 may identify the viewer.

Processor 102 may include an image processor that is a digital signal processor, for example. Processor 102 may perform image processing, which may include classification, feature extraction, pattern recognition, projection, multi-scale signal analysis, pixilation, and filtering, for example. Processor 102 may generate different video frames for each of the plurality of viewers according to viewer generated preferences. Processor 102 may leverage overlay techniques to mix common elements of the video stream and viewer-specific elements.

Storage 106 may include preferences of viewers. For example, a viewer who lives proximate with system 200 may input preferences that may be long-term. These preferences may be stored indefinitely, for example. Other viewers may elect to store preferences in the short-term. Short-term may be defined as for a given day, or for a given program, for example. As would be evident to those possessing an ordinary skill in the pertinent arts, viewers may store some preferences as long-term, while storing others short-term. For example, in the situation where a viewer likes to watch the television on a high brightness setting, the viewer may program this brightness setting as long-term. While watching a foreign film, the viewer may decide that sub-titles are needed to enhance the viewing, so the viewer may select sub-titles as a short-term preference. That is, sub-titles may be displayed as a preference only for the particular film that is being viewed. A default set of preferences may be created and used for viewers for whom there are not set preferences and/or for viewers who are not recognized. The creation and handling of preferences may be variable and tailored to the specific preferences and ease of use of viewers of system 200.

Preferences may be directed to volume, contrast, brightness, color, closed captioning, sub-titles, language, and other viewer controllable settings for the display device. Preferences may be stored locally and/or using a cloud or network based storage system. In the cloud based situation, viewer preferences many be augmented by accessing other network based devices to extract information, such as information to assist in identifying a user and allow preferences to operate across multiple display devices. A user may move around and be provided with associated user preferences.

Display device 230 may include a standard display that provides audio and video to viewers. Display device 230 may be a television, computer monitor, or other electronic display. Display device 230 may include optical elements between the display screen and each viewer to enable the projection of different images to certain viewers. These optical elements may include active shutter glass, for example, and/or be based on the position of the viewers, for example.

The optical elements may include known techniques used to provide information to a viewer's eyes, allowing the viewers to invoke the standard parallax used in determining depth of an object. These elements provide the ability to send multiple images to a given location in a room, for example. Some elements include color filters, also called anaglyph glasses, polarized glasses, shutter glasses, and autostereoscopy.

Using color filters, a viewer may wear a different color glass filter on each eye so that each eye is able to view only one of the two displayed images. That is, the display includes two images, a first one viewable in one color and a second one viewable in another color. The color of light is governed by the wavelength. When a first viewer wears one color glasses and a second viewer wears a second color glasses, each viewer may view a different image. The first viewer viewing the first image and the second viewer viewing the second. Common portions of the image may be provided in both colors enabling the first and second viewer to view the common portions of the image. Glasses may also be designed to include multiple colored glasses thereby allowing, for example, two discrete wavelengths of the image through to a viewer's eyes. In this way, one color may be designed for only that viewer to see and the second color may be a common color that is shared among multiple viewers, in conjunction with other viewers' glasses, to provide common images. Multiple colors may be used to increase the number of viewers that are able to use system 200 at a given time.

For polarizing glasses, the images are displayed using different polarization states and the glasses allow one viewer to see a first state and another viewer to see a second. Polarization of light is defined as the plane along which the electric field of the light oscillates. The polarization of the light from the display enables the ability to selectively screen out light based on polarization by using polarizing films. As described with respect to the color filters, one viewer viewing one color and the other viewer viewing another color, in the polarizing example, one viewer is permitted to view a first polarization from the display and the second viewer a second polarization from the display. For example, the display may display two images with different polarizations, such as mutually orthogonal to each other. One of the two images may be right-circularly polarized and the other left-circularly polarized. The glasses include films to allow the first polarization state to the first viewer and the second polarization state to the second viewer. Although, any polarization distinction may be used, the advantage of circularly polarized light is that tilting the glasses does not change the contrast or brightness of the image transmitted through the films. This allows each of the two viewers to view a different image, similar to the color glasses example described above. Once again, common images may be displayed in each of the polarization states to allow both the first and second viewers to view the common images. The polarized glasses may be designed to allow two discrete polarization states to reach the viewer's eyes. In this way, one polarization may be designed to be limited only to that viewer while the other is designed to be a common channel that passes information for all or many viewers. Multiple polarization states may be used to increase the number of viewers that are able to use system 200 at a given time.

Shutter glasses may operate by allowing one viewer to view one image and another viewer to view another image as the color and polarized concepts above. Display device 230 may alternate between displaying the first image and the second image sequentially on a display device. Shutter glasses are then used to distinguish between the two images, allowing one viewer to view the first image and the second viewer to view the second image. The shutter glasses may operate at the same frequency with an offset to capture distinct different portions of the images displayed on display device 230. Each set of the shutter glasses acts as a shutter with the first set and the second set shuttered alternating in a synchronized manner allowing each viewer to only view the image corresponding to that viewer as displayed by the display. The glasses may be synchronized with the display, such as by using Bluetooth®, infrared, or radio technology, for example. The glasses may include liquid crystals that may be made opaque to provide the shutter. Common images may be displayed in each of the images to allow both the first and second viewers to view the common images. In a similar fashion to the previously discussed elements, multiple frequencies may be designed into the shutter glasses to enable display to control information directed to specific viewers and account for the overlap in information intended to be presented to more than one viewer. For example, a major offset and a minor offset of the shutter glasses may be used with the major offset being designed to allow information that is specifically preferred by a viewer and the minor offset being used to allow common information across multiple viewers, for example. Multiple offsets may be used to increase the number of viewers able to use system 200.

Autostereoscopy is a method of displaying stereoscopic image without the use of headgear or glasses, and may be referred to glasses-free or glassless viewing. Autostereoscopy may rely on the use of optical elements between the display and the viewer so that each viewer receives a different image. Two autostereoscopy approaches may be used to accommodate the motion parallax and wide viewing angles, including eye-tracking and multiple views. Examples of autostereoscopy may include parallax barrier, lenticular, volumetric, electroholographic, and light field displays. Lenticular lenses, using a grooved shape, may be used to provide a projection of different images based on viewing angles. Parallax barriers may also be used to create the stereoscopic display. The parallax barrier may take the form of switchable liquid crystals, for example. The crystals may be tuned by applying a potential so as to control the direction in which light is displayed. As a result of this control, the image viewed by the one viewer and a second viewer may be independently modulated. Such displays may have multiple viewing zones to view the image at the same time. Common images may be displayed in each of the images to allow both the first and second viewers to view the common images.

Each of these optical elements may be used simultaneously with left eye, right eye technologies. Multiple viewer, multiple eye technology may include multiple use of a single element or using a first element in combination with a second or additional element. This may include using a first of these techniques to provide different images to different viewers and overlaying a second technology to provide parallax to a given viewer. That is, a set of glasses may be created that includes polarization states to discern images from one viewer to another, and coupled thereto the glasses may include color filters that operate to provide parallax using distinct left eye, eight eye color schema.

While the description contained herein includes several exemplary delivery technologies, these technologies are provided to aid in the understanding of the embodiments, and the embodiments are not so limited. The embodiments contemplate the use of any delivery technology and is not limited to the examples contained herein.

The elements described above include descriptions that focus on two viewers. The use of two viewers is for ease of understanding. Any number of viewers may be employed and the elements and techniques described may be extrapolated to include three, four, or more viewers.

Reader 240 may determine the location of viewers and identify each of the viewers. The information from reader 240 may be used as feedback to the display device 230 to provide the display to a viewer in accordance with the viewer's preferences. Reader 240 may include tracking of viewers and/or facial recognition techniques allowing detection and identification of viewers.

Reader 240 may operate to detect and identify one or more viewers using a number of different techniques as may be described in more detail below and briefly here to provide a framework for continued understanding of the system and method. System 200 may use a camera system equipped with a facial recognition type program to detect and identify viewers, a token system that includes having a token with each viewer to enable identification of that viewer, and passive system that enables viewers to use a remote control or other input device to identify themselves to system 200 by providing identification and location information, for example.

Figure 2B:
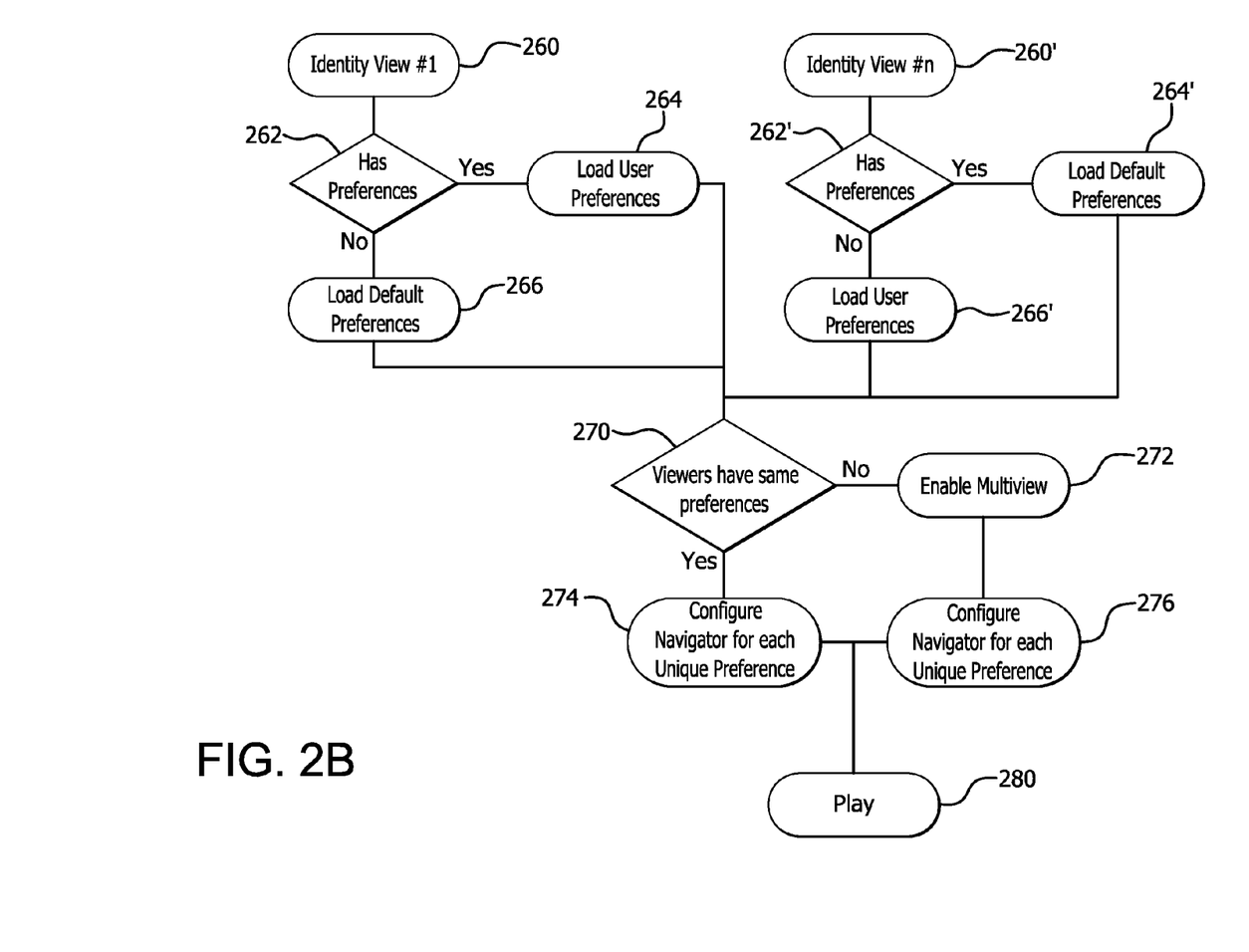
FIG. 2B illustrates a flow diagram for providing multiple viewer preferences in accordance with the system of FIG. 2A, in accordance with some embodiments.

Reference is also made to FIG. 2B, which shows a flow diagram for providing multiple viewer preferences. This flow diagram identifies a viewer at step 260. Once the viewer is identified in step 260, it may be determined if that identified viewer has preferences within system 200, at step 262. In the event that the viewer has stored preferences, these preferences may be loaded in step 264. In the event that the viewer does not have stored preferences, or stored preferences cannot be located or associated with the identified viewer, default preferences may be loaded at step 266.

As depicted in FIG. 2B, additional viewers may also use system 100, in accordance with some embodiments. In the case of FIG. 2B, the flow for identifying two viewers is shown, although the choice of two viewers is provided to understand the embodiments, while realizing that any number of viewers may use the system and be identified in the flow of FIG. 2B. A second (or third or more) viewer may be identified as shown in FIG. 2B. As discussed above with respect to the first viewer, this flow diagram identifies a viewer at step 260'. Once the viewer is identified in step 260', it may be determined if that identified viewer has preferences within system 200, at step 262'. In the event that the viewer has stored preferences, these preferences may be loaded in step 264'. In the event that the viewer does not have stored preferences, or stored preferences cannot be located or associated with the identified viewer, default preferences may be loaded at step 266'.

Once two or more viewers are identified as described above, a comparison of the viewer preferences may be performed at step 270. If the identified viewers have the same preferences, a single viewing mode may be enabled to satisfy the viewer preferences at step 274. If the identified viewers have different preferences, wherein different preferences are defined as a set of preferences that deviate from another set of preferences, a multi-viewer mode may be enabled at step 272. Once in the multi-viewer mode, system 200 may be configured for each unique preference of each set of preferences at step 276. After configuring for a single set of viewing preferences step 274 or for each unique viewing preference step 276, the program may be played according to the determined preferences at step 280.

Wireless headphones 250 may also be included in system 200. Wireless headphones may include the ability to adjust the volume presented to viewers based on the viewer's preference.

In a situation where only a single viewer is viewing display device 230, display device 230 may provide the images in accordance with that viewer's preferences without the need to include other signals.

Figure 3:
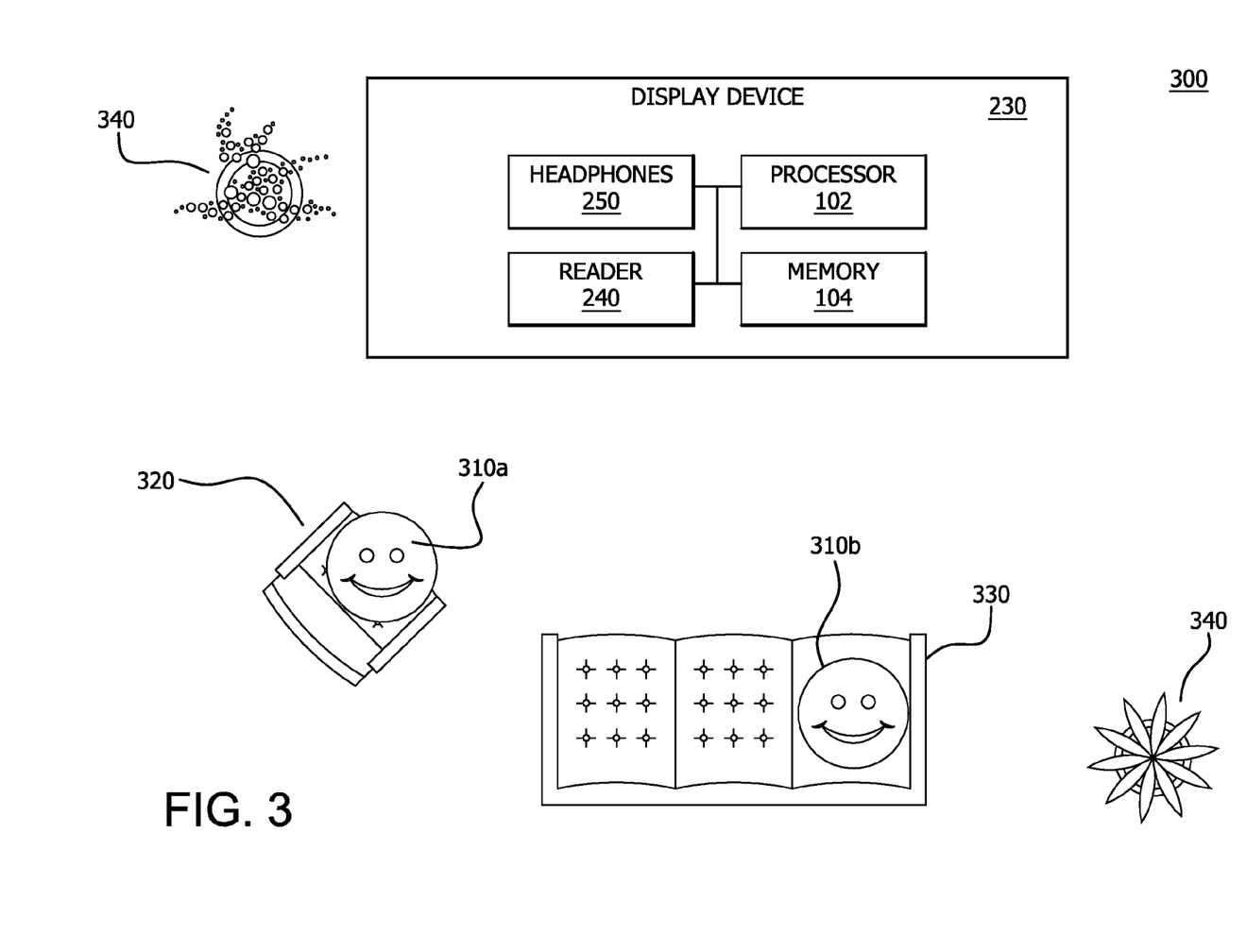
FIG. 3 illustrates the system of FIG. 2A in an operational setting, in accordance with some embodiments.

FIG. 3 illustrates system 200 in an operational setting 300, in accordance with some embodiments. Setting 300 includes display device 230, processor 102 coupled to storage 106 that collectively produce information to be displayed on a display device 230, reader 240, wireless headphones 250, a plurality of viewers 310, identified individually as viewers 310a, 310b, although any number may be present, and collectively as viewers 310, a recliner 320, a sofa 330, a plurality of plants 340, and pictures (not shown).

Processor 102 is coupled to storage 106 to produce information to be displayed on display device 230 as described herein. Reader 240 and headphones 250 operate as described herein. Display device 230 produces images for the viewing of viewers 310. As shown, viewer 310a is sitting on recliner 320, viewer 310b on sofa 330 and plants 340 and pictures may be included in setting 300.

In an example, viewers 310a and 310b are watching a foreign movie. Viewer 310a speaks and comprehends the foreign language of the movie, while viewer 310b requires English sub-titles to follow the movie. This preference information may be included in storage 106. When processor 102 identifies the movie as being a foreign film in a foreign language, and accesses storage 106, system 200 may be activated to provide the movie without sub-titles to viewer 310a, and provide the movie with English sub-titles to viewer 310b.

In an example, viewers 310a and 310b are both interested in watching programs on display device 230. A first program is presented to viewer 310a and a second program is presented to viewer 310b. Audio for each program may be handled using at least one set of headphones 250.

In an example, similar to the preferences for viewing in the sub-title example above, viewers 310 may have individual preferences for audio presentation. As such headphones 250 may be identified in storage 106 as being used by a given viewer 310. That particular viewer's 310 audio preference may be provided to that viewer's headphones 250. In such a situation, one viewer 310a may listen in English, while another viewer 310b may prefer to listen in Spanish.

Figure 4:
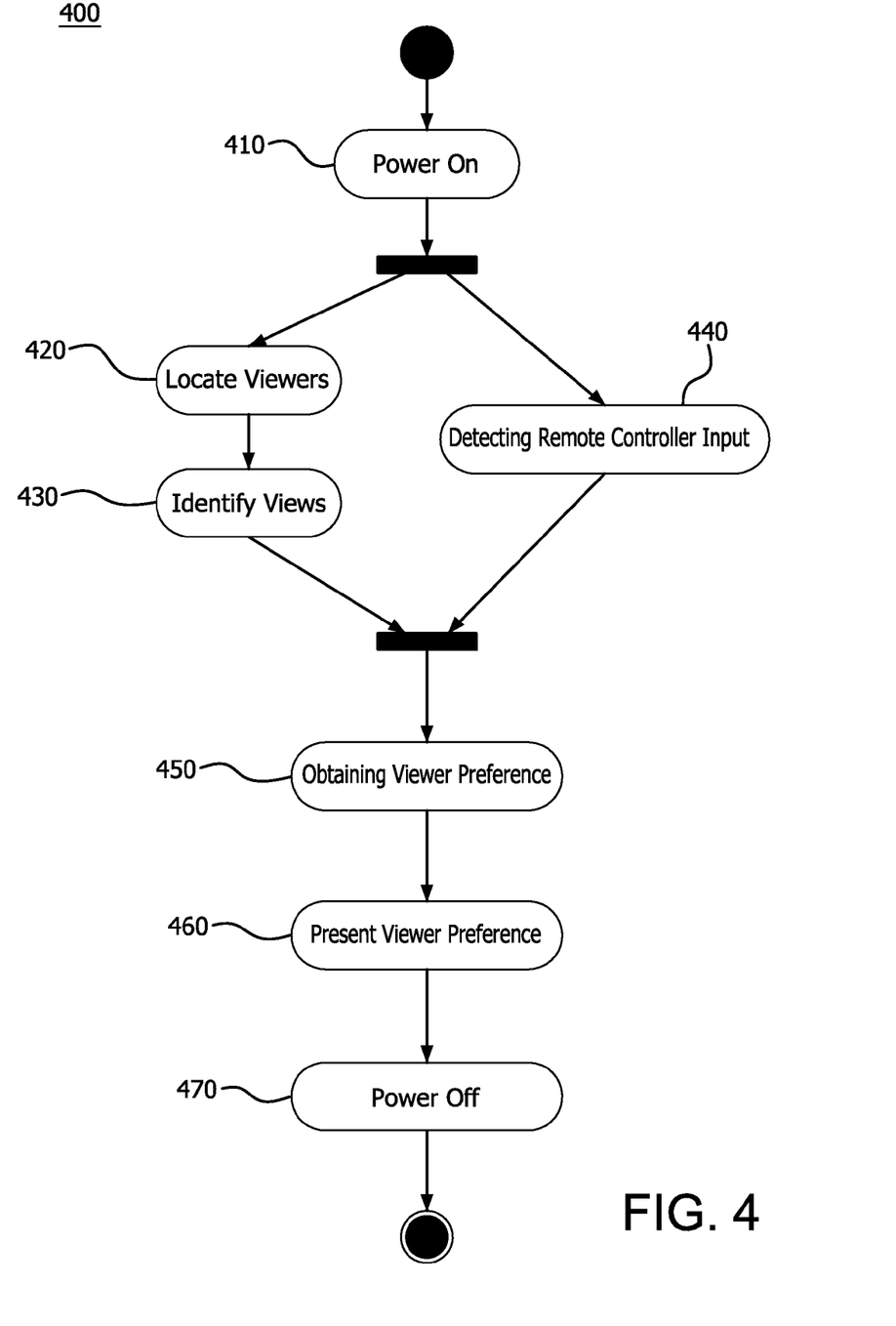
FIG. 4 includes a method of providing multiple viewer preferences on a display device, in accordance with some embodiments.

FIG. 4 includes a method 400 of providing multiple viewer preferences on a display device, in accordance with some embodiments. Method 400 includes powering on the system at step 410. Once on, system 200 may locate viewers at step 420 and may identify viewers that are located at step 430. In parallel with the locating 420 and identifying 430 of viewers, method 400 may include detecting remote controller input at step 440. Method 400 may include obtaining viewer preferences at step 450 and presenting the obtained viewer preference at step 460. Upon completion of the delivery or the end of viewing, system 200 may be powered off at step 470.

Identifying viewers may occur in a number of ways. For example, the system may use a camera system and facial recognition to automatically identify viewers, the system may utilize a token or device that a viewer is using to identify a viewer within the system and a viewer may use an input device, such as a remote control, to identify them to the system. Viewers using a token or device may identify themselves to system 200 via special shutter glasses, or other reference that the viewer has proximate to their person to enable the system to locate and identify them as the viewer. An input device may also be used to identify viewers, such as by providing a set of identity buttons or access to a menu that enables input of identity of viewers. In such a configuration, after locating oneself for viewing, the viewer may initiate an input to system 200. The input may send out a signal, such as an infrared signal, for example. The receivers on the display device may capture the signal and process the signal to determine the location and identification of the viewer. Identification may include only identifying the viewer and may also include locating the viewer, as well.

Figure 5A:
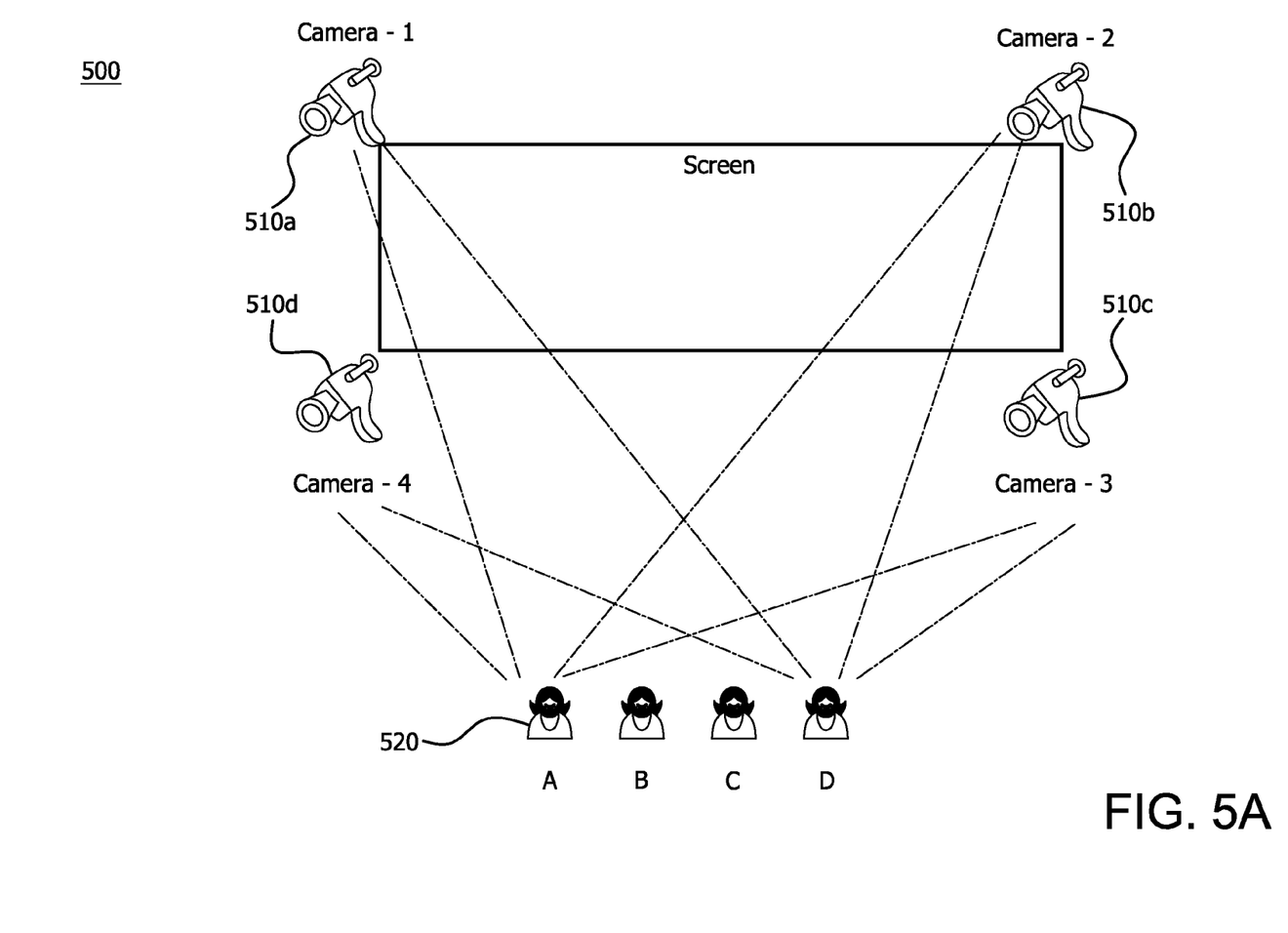
FIG. 5A illustrates a diagram of a system that may be used in accordance with the system of FIG. 2A to identify viewers, in accordance with some embodiments.

A configuration using a camera system and facial recognition to identify a viewer is depicted in FIG. 5A. The example of FIG. 5A includes the use of four cameras 510 by example only. One of ordinary skill in the art would recognize that more or less cameras may be used to locate viewers. In FIG. 5A, each camera 510 is located proximate to the corner of the display screen. For example, camera 510a is located in the upper-left corner of the screen as shown in FIG. 5A, while 510b is proximate to the upper-right corner, 510c is proximate to the lower-right corner, and 510d is proximate to the lower-left corner.

Figure 5B:
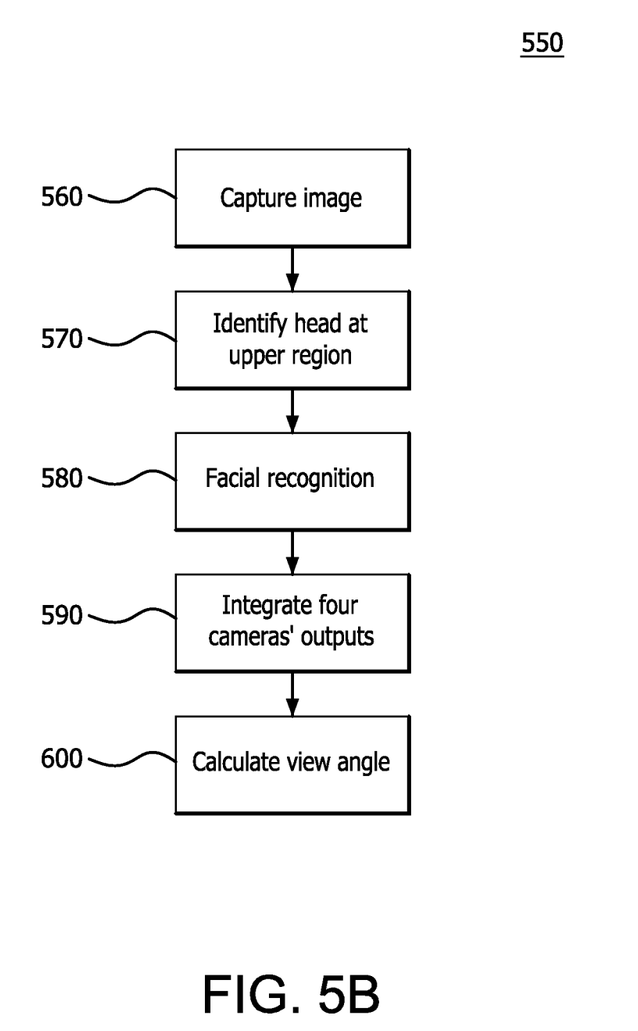
FIG. 5B illustrates a flow diagram for identifying viewers in accordance with the system of FIG. 5A, in accordance with some embodiments.

Operationally, a flow 550 depicted in FIG. 5B may be performed to identify the viewers 520 of FIG. 5A. Each camera 510 depicted in FIG. 5A may perform flow 550 of FIG. 5B. An image of a viewer and/or viewers, such as viewers A, B, C, D, may be captured at step 560. Acquisition of the viewer may occur at step 570, such as using the head at upper region, motion sensing technology, and spatially targeted communication to locate the viewer, for example. Recognition may be performed, at step 580, on the identified head. For example, facial recognition may be performed. The output of the myriad of cameras 510 may be accumulated and/or integrated at step 590. The location and view angle of the identified viewer may be calculated at step 600.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer readable storage medium is a non-transitory computer readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for providing viewer preferences on a display device, the system comprising:
   a storage medium for storing preset viewer preferences, each preference being categorized based on one of a plurality of viewers;
   a processor that accesses the storage medium and acquires the stored preset viewer preferences for a given one of the plurality of viewers;
   comparing the given one's viewer preferences against at least another one's viewer preferences; and
   a display device that provides content to the given one viewer in accordance with the given one viewer's preferences using at least one optical element, wherein the display device toggles between standard and multiview modes based on the comparison.

2. The system of claim 1, further comprising a reader to identify one of the plurality of viewers and provide information to the processor regarding the identified viewer to enable acquisition of the stored preset viewer preferences for the identified viewer.

3. The system of claim 2, wherein the reader comprises a camera system that captures at least one image used to identify one of the plurality of viewers.

4. The system of claim 2, wherein the reader comprises a camera system that captures at least one image used to calculate the viewing angle of the one of a plurality of viewers.

5. The system of claim 2, wherein the identifying comprises facial recognition.

6. The system of claim 2, wherein the identifying comprises motion sensing.

7. The system of claim 2, wherein the identifying comprises spatially target communication.

8. The system of claim 2, wherein the reader locates one of a plurality of viewers.

9. The system of claim 2, wherein the reader detects one of a plurality of viewers.

10. The system of claim 2, further comprising headphones to enable the providing of audio to the plurality of viewers.

11. The system of claim 10, wherein the processor defaults to a default set of preferences if the stored present viewer preferences for a given one of the plurality of viewers is not accessible.

12. The system of claim 1, wherein the storage medium is cloud based.

13. The system of claim 12, wherein one of a plurality of viewer preferences are capable of being accessed from a second display device.

14. A method of providing multiple viewer preferences on a display device, the method comprising:
    identifying at least one viewer of a plurality of viewers of the display device;
    obtaining a viewer preference for the at least one of a plurality of viewers;
    enabling a multiview mode on the display device; and
    providing information from a display device to the at least one of a plurality of viewers in accordance with the obtained viewer preference, wherein the display device toggles between the multiview mode and a standard mode based on a comparison of the viewer preference of the at least one of a plurality of viewers against viewer preferences of a second of the plurality of viewers.

15. The method of claim 14, further comprising loading a set of default preferences for any of the plurality of viewers that remain not identified.

16. The method of claim 14, further comprising loading a set of default preferences for any of the plurality of viewers that do not have associated therewith viewer preferences.

17. The method of claim 14, further comprising identifying a second of the plurality of viewers viewing the display device.

18. The method of claim 17, further comprising obtaining the viewer preferences for the second of the plurality of viewers.

19. The method of claim 14, wherein the identifying comprises a camera system that captures at least one image used to calculate the viewing angle of the at least one viewer.

20. The method of claim 14, wherein the identifying comprises facial recognition.

21. The method of claim 14, further comprising locating at least one viewer of a plurality of viewers of the display device.

22. The method of claim 14 wherein the identifying comprise utilizing network information from a viewers network based device.

23. A non-transitory computer readable medium having processor-executable instructions stored thereon which, when executed by at least one processor, will cause the at least one processor to perform a method for providing multiple viewer preferences on a display device, the method comprising:
    identifying at least one viewer of a plurality of viewers of the display device;
    obtaining a viewer preference for the at least one of a plurality of viewers;
    enabling a multiview mode on the display device; and
    providing information from a display device to the at least one of a plurality of viewers in accordance with the obtained viewer preference, wherein the display device toggles between the multiview mode and a standard mode based on a comparison of the viewer preference of the at least one of a plurality of viewers against viewer preferences of another one of the plurality of viewers.

24. The non-transitory computer readable medium of claim 23, further comprising loading a set of default preferences for any of the plurality of viewers that remain not identified.

25. The non-transitory computer readable medium of claim 23, further comprising loading a set of default preferences for any of the plurality of viewers that do not have associated therewith viewer preferences.

26. The non-transitory computer readable medium of claim 23, wherein the identifying comprises a camera system that captures at least one image used to calculate the viewing angle of the at least one viewer.

* * * * *